(12) United States Patent
Heinbuch et al.

(10) Patent No.: US 11,131,240 B1
(45) Date of Patent: Sep. 28, 2021

(54) ENGINE ASSEMBLY INCLUDING A FORCE SPLITTER FOR VARYING COMPRESSION RATIO USING AN ACTUATOR

(71) Applicant: GM GLOBAL TECHNOLOGY OPERATIONS LLC, Detroit, MI (US)

(72) Inventors: Ryan Heinbuch, Commerce Township, MI (US); Dumitru Puiu, Sterling Heights, MI (US); Justin Ketterer, LaSalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/874,716

(22) Filed: May 15, 2020

(51) Int. Cl.
*F02B 75/04* (2006.01)
*F02D 15/02* (2006.01)
*F16H 1/32* (2006.01)

(52) U.S. Cl.
CPC .......... *F02B 75/048* (2013.01); *F02B 75/045* (2013.01); *F02B 75/047* (2013.01); *F02D 15/02* (2013.01); *F16C 2360/22* (2013.01); *F16H 2001/323* (2013.01); *F16H 2200/2097* (2013.01)

(58) Field of Classification Search
CPC ...... F02B 75/04; F02B 75/048; F02B 75/047; F02B 75/045; F02D 15/02; F16C 2360/22; F16H 2001/323; F16H 2200/2097
See application file for complete search history.

(56) References Cited

U.S. PATENT DOCUMENTS

| | | | |
|---|---|---|---|
| 6,450,136 B1 | 9/2002 | Klomp et al. | |
| 6,546,900 B2 | 4/2003 | Arai et al. | |
| 6,622,672 B1 | 9/2003 | Styron et al. | |
| 8,794,200 B2 * | 8/2014 | Jacques | F01L 1/344 123/78 F |
| 9,476,366 B2 | 10/2016 | Tanaka et al. | |
| 10,125,679 B2 | 11/2018 | Zahdeh | |
| 10,358,973 B2 | 7/2019 | Vogel | |
| 10,400,666 B2 | 9/2019 | Hiyoshi et al. | |
| 10,487,754 B1 | 11/2019 | Choi | |
| 10,590,844 B2 | 3/2020 | Vogel et al. | |
| 2018/0010619 A1 | 1/2018 | Jaaskelainen | |
| 2018/0363547 A1 * | 12/2018 | Nakamura | F02B 75/048 |
| 2019/0323390 A1 | 10/2019 | Balding et al. | |

* cited by examiner

*Primary Examiner* — Jacob M Amick

(57) ABSTRACT

An engine assembly including a crankshaft, a bell crank pivotally mounted on the crankshaft, the bell crank having a first end and a second end opposite of the first end, a connecting rod connected to the first end of the bell crank, a control shaft, a control link mounted on the control shaft and connected to the second end of the bell crank, a driven gear fixed to the crankshaft, a drive gear fixed to the control shaft, an actuator, and a split-torque gear box splitting the torque from the driven gear between the drive gear via a first torque path and the actuator via a second torque path.

20 Claims, 4 Drawing Sheets

ENGINE ASSEMBLY INCLUDING A FORCE SPLITTER FOR VARYING COMPRESSION RATIO USING AN ACTUATOR

FIELD

The present disclosure relates to an engine assembly including a force splitter for varying compression ratio using an actuator.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A variable compression ratio (VCR) engine typically includes an engine block defining a cylinder, a piston disposed within the cylinder, a connecting rod, a crankshaft, a bell crank, a control link, a control shaft, and a gearbox. The bell crank is pivotally mounted on the crankshaft. The connecting rod connects the piston to one end of the bell crank. The control link connects the other end of the bell crank to the control shaft.

As the piston translates within the cylinder, the connecting rod applies a force to the bell crank, and the control link transfers the force from the bell crank to the control shaft, which causes the control shaft to rotate. The gearbox transfers force from the control shaft back to the crankshaft and ensures that rotation of the two shafts is in time (or in phase). In addition, the gearbox couples an actuator, such as an electric motor, to the control shaft. The electric motor is operable to vary the speed of the control shaft relative to the speed of the crankshaft, and thereby vary the compression ratio of the cylinder.

The gearbox of a VCR engine typically includes a driven gear fixed to the crankshaft, a drive gear fixed to the control shaft, a first gear mounted on a transfer shaft (or carrier), and a second gear fixed to the transfer shaft (or carrier). The first gear is engaged with the driven gear, and the second gear is engaged with the drive gear In addition, the electric motor of the VCR engine (or a shaft of the electric motor) is typically fixed to the transfer shaft (or carrier) so that the electric motor rotates with the transfer shaft.

In VCR engines such as the one described above, the electric motor may work against the full torque of the crankshaft to adjust the phasing of the control shaft relative to the crankshaft. Thus, the electric motor may need to be large in size with a high torque output, and an expensive high ratio reducer may be required to couple the electric motor to the transfer shaft. In addition, the parasitic losses of such a VCR engine is high.

SUMMARY

In an exemplary aspect, an engine assembly includes a crankshaft, a bell crank pivotally mounted on the crankshaft, the bell crank having a first end and a second end opposite of the first end, a connecting rod connected to the first end of the bell crank, a control shaft, a control link mounted on the control shaft and connected to the second end of the bell crank, a driven gear fixed to the crankshaft, a drive gear fixed to the control shaft, an actuator, and a split-torque gear box splitting the torque from the driven gear between the drive gear via a first torque path and the actuator via a second torque path.

In another exemplary aspect, the split-torque gear box includes a planetary gear set with a carrier engaging the driven gear, a sun gear engaging the actuator, a ring gear engaging the drive gear, and a planetary gear rotatably mounted on the carrier and engaging the sun gear and the ring gear.

In another exemplary aspect, the split-torque gear box includes a cycloidal gear set with a ring gear engaging the driven gear, a sun gear engaging the actuator, a transfer shaft engaging the drive gear, and a cycloidal reducer connected to the transfer shaft through a series of pins.

In another exemplary aspect, the gear ratio of the second torque path is higher than the gear ratio of the first torque path.

In another exemplary aspect, the actuator is a variable displacement oil pump that is driven via the second torque path.

In another exemplary aspect, increasing the displacement of the variable displacement oil pump slows down the speed of the variable displacement pump to advance the control shaft and increase a compression ratio of the engine assembly.

In another exemplary aspect, decreasing the displacement of the variable displacement oil pump increases the speed of the variable displacement pump to retard the control shaft and decrease a compression ratio of the engine assembly.

In another exemplary aspect, the actuator is an oil pump in communication with a variable orifice and which is driven via the second torque path.

In another exemplary aspect, decreasing the size of the variable orifice slows down the speed of the oil pump to advance the control shaft and increase a compression ratio of the engine assembly.

In another exemplary aspect, increasing the size of the variable orifice increases the speed of the oil pump to retard the control shaft and decrease a compression ratio of the engine assembly.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
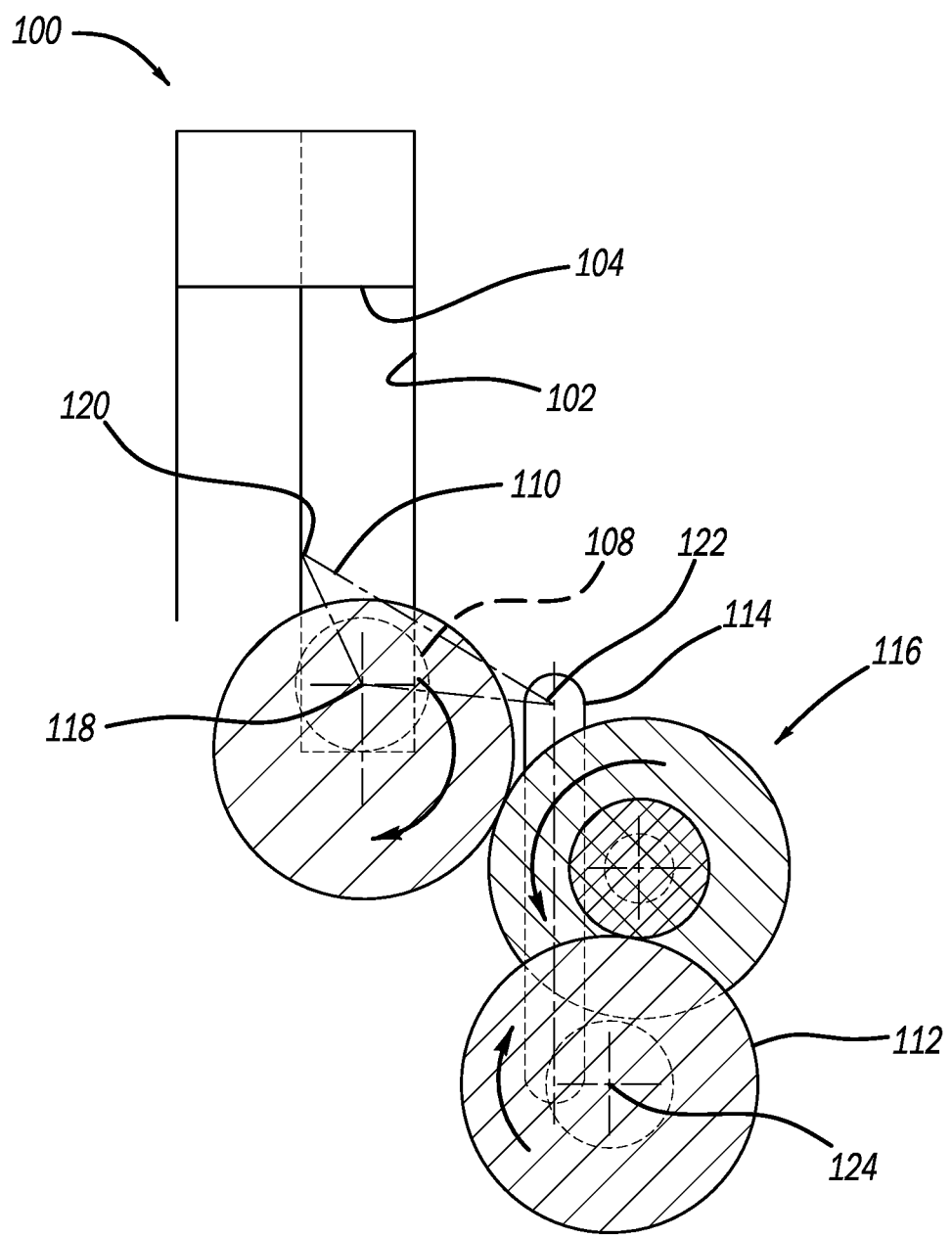
FIG. 1 is a schematic section view of an engine assembly including a variable compression ratio (VCR) gear box.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

To address the above issues, a VCR engine according to the present disclosure includes a split torque gearbox with one torque path from the control shaft to the crankshaft, and another torque path from the actuator to the crank shaft. The torque path between the control shaft and the crankshaft carrying a higher amount of torque than the torque path between the actuator and the crankshaft. With this arrangement, the actuator only works against a fraction of the VCR gear box torque. Thus, an actuator that is used by an exemplary embodiment of the present disclosure may be smaller than an actuator that is conventionally used to adjust the compression ratio of a VCR engine.

Referring now to the drawings, wherein like reference numbers correspond to like or similar components throughout the several figures, FIG. 1 is an engine assembly 100 includes a cylinder 102, a piston 104, a connecting rod 106, a crankshaft 108, a bell crank 110, a control shaft 112, a control link 114, and a gearbox 116. The piston 104 reciprocates within the cylinder 102 when an air-fuel mixture is combusted within the cylinder 102. For illustration purpose, FIG. 1 shows only one cylinder of the engine assembly 100. However, the engine assembly 100 may include additional cylinders. The engine assembly 100 may be a spark-ignition engine or a compression-ignition engine.

The bell crank 110 is mounted on the crankshaft 108 in a manner that allows the bell crank 110 to pivot about a rotational axis 118 of the crankshaft 108. The bell crank 110 has a first end 120 and a second end 122 opposite of the first end 120. The bell crank 110 may have nodes or pins for connections with the crankshaft 108, the connecting rod 106, and the control link 114, and the nodes or pins may be arranged in a T-shape, in a triangle shape, or in-line with one another.

The connecting rod 106 connects the piston 104 to the first end 120 of the bell crank 110. The connecting rod 106 may be pivotally coupled to the piston 104 and the bell crank 110 using, for example, pins (not shown). The control link 114 is mounted on the control shaft 112 in a manner that allows the control link 114 to pivot about a rotational axis 124 of the control shaft 112. The control link 114 is connected to the second end 122 of the bell crank 110. The connecting rod 106 may be pivotally coupled to the bell crank 110 using, for example, a pin (not shown).

The connecting rod 106, the bell crank 110, and the control link 114 collectively convert the translational motion of the piston 104 into rotational motion of the crankshaft 108. In other words, the connecting rod 106, the bell crank 110, and the control link 114 cause the crankshaft 108 to rotate when the piston 104 reciprocates within the cylinder 102. As the piston 104 reciprocates within the cylinder 102, the connecting rod 106 pivots (e.g., rocks back and forth) about the first end 120 of the bell crank 110. The pivoting motion of the connecting rod 106 causes the bell crank 110 to pivot (e.g., rock back and forth) about the rotational axis 118 of the crankshaft 108. The pivoting motion of the bell crank 110 causes the control link 114 to pivot (e.g., rock back and forth) about the rotational axis 124 of the control shaft 112.

As will be described further, the gearbox 116 synchronizes rotation of the crankshaft 108 with rotation of the control shaft 112. In addition, the gearbox 116 connects an actuator (not shown in FIG. 1) to the control shaft 112 in a manner that allows the actuator to vary the speed of the control shaft 112 relative to the speed of the crankshaft 108. Varying the speed of the control shaft 112 relative to the speed of the crankshaft 108 varies the stroke and top dead center (TDC) position of the piston 104, which varies the compression ratio of the engine assembly 100.

Figure 2:
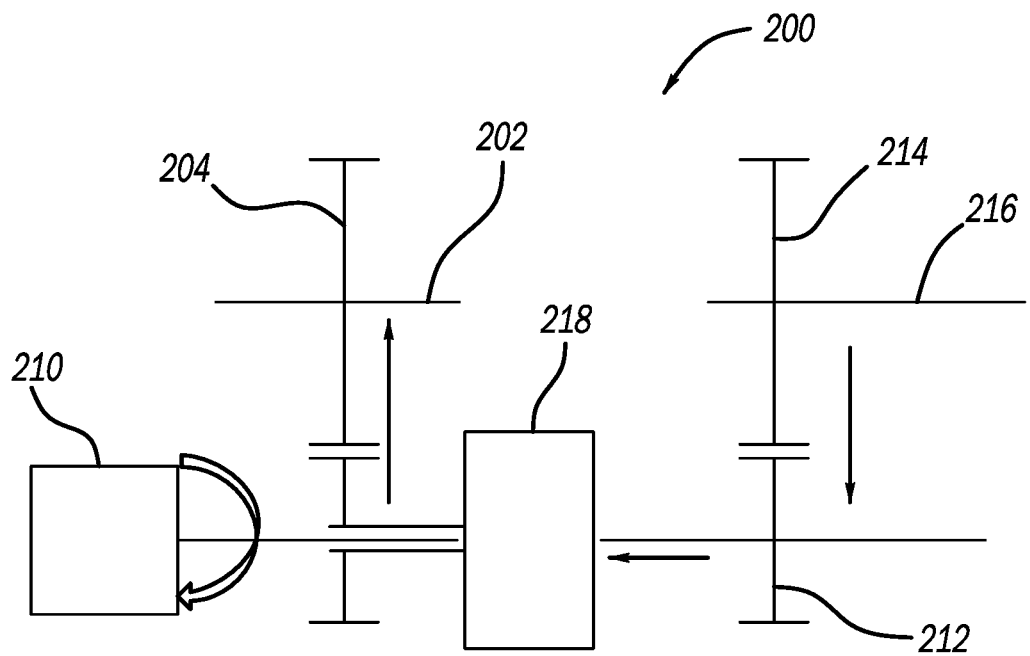
FIG. 2 is a schematic representation of a conventional VCR gear box.

FIG. 2 is a schematic representation of a conventional VCR gear box 200. The gear train 200 includes a crankshaft 202, a second driven gear 204, a second drive gear 206, an actuator shaft 208, an actuator 210, a first driven gear 212, a first drive gear 214, a control shaft 216, and an in-line phaser 218. The second driven gear 204 fixed to the crankshaft 202. The second driven gear 204 engages with the second drive gear 206. The second drive gear 206, the actuator shaft 208, the in-line phaser 218 and the first driven gear 212 form component portions of a high ratio gear reduction system. The in-line phaser 218 may be, for example, a strain wave gear drive, a cycloidal gear drive, and the like, in a manner which is known in the art. The first driven gear 212 engages the first drive gear 214 which is fixed to the control shaft 216 of a VCR engine system such as that illustrated in FIG. 1. In this manner, the actuator 210 may be controlled to alter the phase angle via the in-line phaser 218 between the crankshaft and the control shaft and, thereby, control the compression ratio of an engine assembly such as that illustrated in FIG. 1.

A problem with the VCR gear box 200 is that the actuator 210 is required to operate against the full torque of crank shaft 202. If an electric motor is used as the actuator, then the size of the electric motor must be very large in order to provide enough torque to operate the VCR gear box 200. Large electric motors also have correspondingly high parasitic losses which significantly reduces the efficiency of the overall system. Further, the fact that the VCR gear box 200 operates against the full torque of the system, also means that the cost and size of the gear box becomes extremely high. Additionally, VCR gear boxes like that illustrated in FIG. 2, are required to have a very high ratio which limits the type of gear boxes that may be used in this type of system.

To address the above issues, a VCR engine according to the present disclosure includes a split torque gearbox with one torque path from the crankshaft to the control shaft, and another torque path from the actuator to the crank shaft. The torque path between the crankshaft and the control shaft carrying a higher amount of torque than the torque path between the actuator and the crankshaft. With this arrangement, the actuator only works against a fraction of the VCR gear box torque. Thus, an actuator that is used by an exemplary embodiment of the present disclosure may be smaller than an actuator that is conventionally used to adjust the compression ratio of a VCR engine.

In an exemplary aspect of the present invention, a variable compression ratio engine assembly includes a split-torque gear box having a first torque path and a second torque path. The first torque path carrying a higher amount of torque than the second torque path. The first torque path carrying a higher amount of torque between the engine assembly crank shaft and a control shaft of a VCR gear box than the amount of torque carried by the second torque path between the crank shaft and the actuator. The higher torque conveyed by first torque path of the split-torque gear box is phased by any variance of the lower torque that is conveyed by the second torque path. In this manner, the actuator is not required to operate against the full torque of the system. Rather, the actuator is only required to operate against a portion of the torque of the system. This significant reduction in torque handling requirements of the actuator enables the use of a much smaller actuator than has previously been required. This also reduces the cost of the actuator, the complexity of the overall system, and the parasitic loss incurred by the system.

Figure 3:
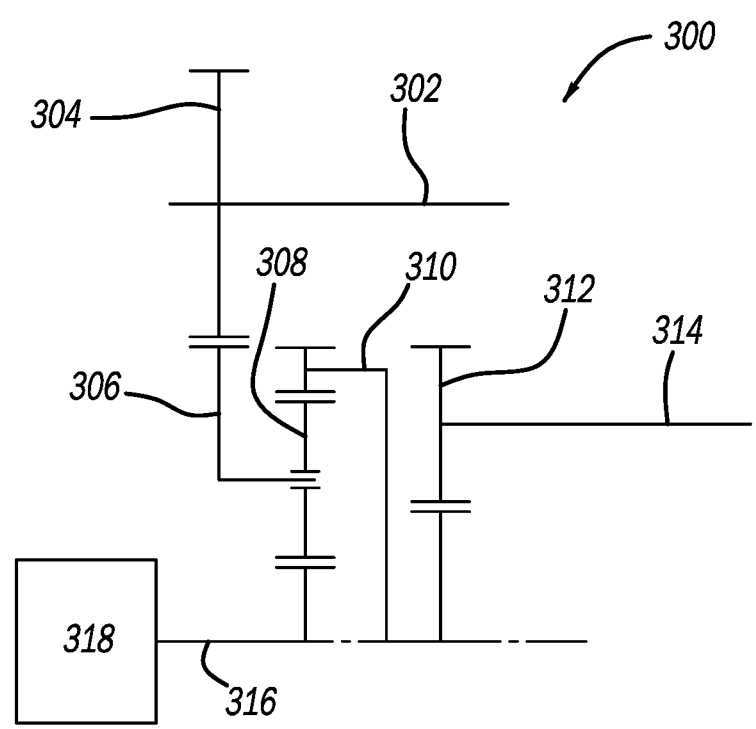
FIG. 3 is a schematic representation of an exemplary embodiment of a VCR gear box in accordance with the present disclosure.

FIG. 3 is a schematic of a VCR gear box 300 which operates as a planetary gear train in accordance with an exemplary embodiment of the present disclosure. The VCR gear box 300 includes a crank shaft 302, a driven gear 304, a carrier 306, a planetary gear 308, a ring gear 310, a drive gear 312, a control shaft 314, a sun gear 316, and an actuator 318. The driven gear 304 is fixed to the crank shaft 302 and engages the carrier 306. The carrier 306 engages at least one of a plurality of planetary gears 308. The planetary gear 308 engages the ring gear 310 which, in turn, engages the drive gear 312 that is fixed to the control shaft 314. The VCR gear box 300 forms a first torque path from the crank shaft 302 that extends through the driven gear 304, the carrier 306, the ring gear 310, the drive gear 312 and to the control shaft 314. The carrier 306 also engages the sun gear 316 which is fixed to the actuator 318. The VCR gear box 300 forms a second torque path from the crank shaft 302 that extends through the driven gear 304, the carrier 306, and the sun gear 316 to the actuator 318. The VCR gear box 300 splits the torque between the first and second torque paths such that the first torque path carries a higher torque than the second torque path. In this manner, any variation in the amount of torque that is driving the actuator 318 causes a variation in the phase of the control shaft 314 relative to the crankshaft 302 which, in turn, varies the compression ratio of a VCR engine assembly which includes the VCR gear box 300.

In addition to reducing the size, cost, and torque capacity of a VCR gear box actuator, the present disclosure eliminates the necessity of providing an actuator that is dedicated solely to the VCR gear box system. In an exemplary aspect, the VCR gear box of the present disclosure may be configured to provide torque to a component that already exists within an engine assembly, thereby obviating the necessity of providing a dedicated actuator. This reduces cost, complexity, space requirements, parasitic losses while improving efficiency and performance. The actuator 318 of the VCR gear box in accordance with the present disclosure may be any power consuming component. Splitting the torque within the VCR gear box and driving the actuator with only a portion of the torque flowing through the gear box enables the use of an actuator having a significantly reduced power requirement. This enables the use of much smaller actuators and improved efficiency and performance.

Figure 4:
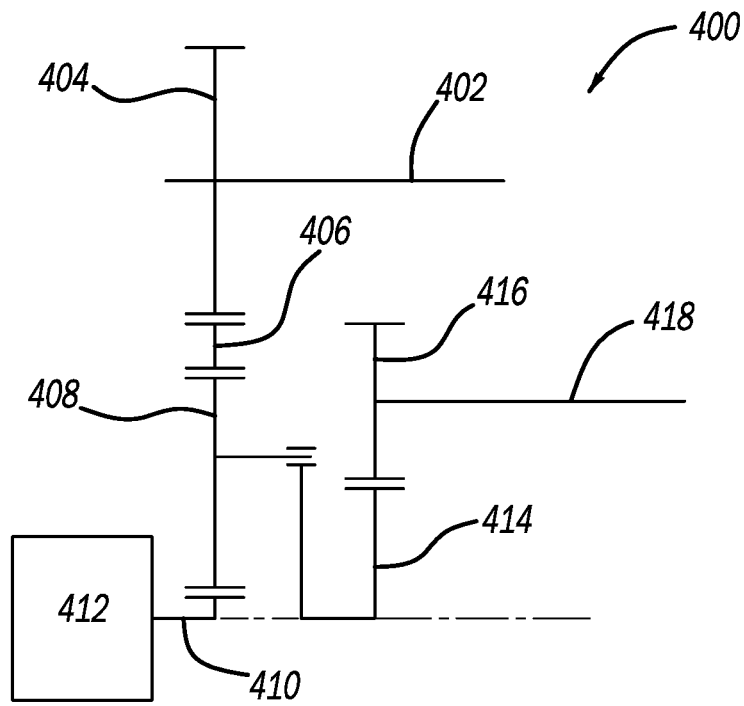
FIG. 4 is a schematic representation of another exemplary embodiment of a VCR gear box in accordance with the present disclosure.

FIG. 4 is a schematic diagram of a VCR gear box 400 which operates as a cycloidal gear train in accordance with another exemplary embodiment of the present disclosure. The VCR gear box 400 includes a crank shaft 402, a driven gear 404, a ring gear 406, a cycloidal reducer 408, a sun gear 410, an actuator 412, a transfer shaft 414, a drive gear 416, and a control shaft 418. The driven gear 404 is fixed to the crank shaft 402 and engages the ring gear 406. The ring gear 406 engages the cycloidal reducer 408. The cycloidal reducer 408 engages the transfer shaft 414 which, in turn, engages the drive gear 416 that is fixed to the control shaft 418. The VCR gear box 400 forms a first torque path from the crank shaft 402 that extends through the driven gear 404, the ring gear 406, the cycloidal reducer 408, the transfer shaft 414, the drive gear 416, and the control shaft 418. The cycloidal reducer 408 also engages the sun gear 410 which is fixed to an output of the actuator 412. The VCR gear box 400, therefore, also forms a second torque path that extends from the crank shaft 402, through the driven gear 404, the ring gear 406, the cycloidal reducer 408, the sun gear 410 to the actuator 412. The VCR gear box 400 splits the torque between the first and second torque paths such that the first torque path carries a higher torque than the second torque path. In this manner, any variation in the amount of torque that is driving the actuator 412 causes a variation in the phase of the control shaft 418 relative to the crankshaft 402 which, in turn, varies the compression ratio of a VCR engine assembly which includes the VCR gear box 400.

In an exemplary embodiment of the present disclosure, the VCR gear box having a split-torque configuration may be used to drive an existing component, such as, for example a variable displacement oil pump. The displacement of a variable displacement oil pump that is driven by the VCR gear box may be controlled to not only vary the amount of oil that is provided to the engine assembly but also to modify the compression ratio. The inventors of the present disclosure noticed that the compression ratio of an engine is generally a function of engine speed and load and the same is true for the oil pump displacement. The power requirements for both the engine and the oil pump follow each other. By selecting the correct ratios for the VCR gear box so that the appropriate amount of torque is distributed to the oil pump, the displacement of the oil pump may be varied to control the speed of the eccentric shaft (control shaft), and correspondingly control the compression ratio of the engine.

Figure 5:
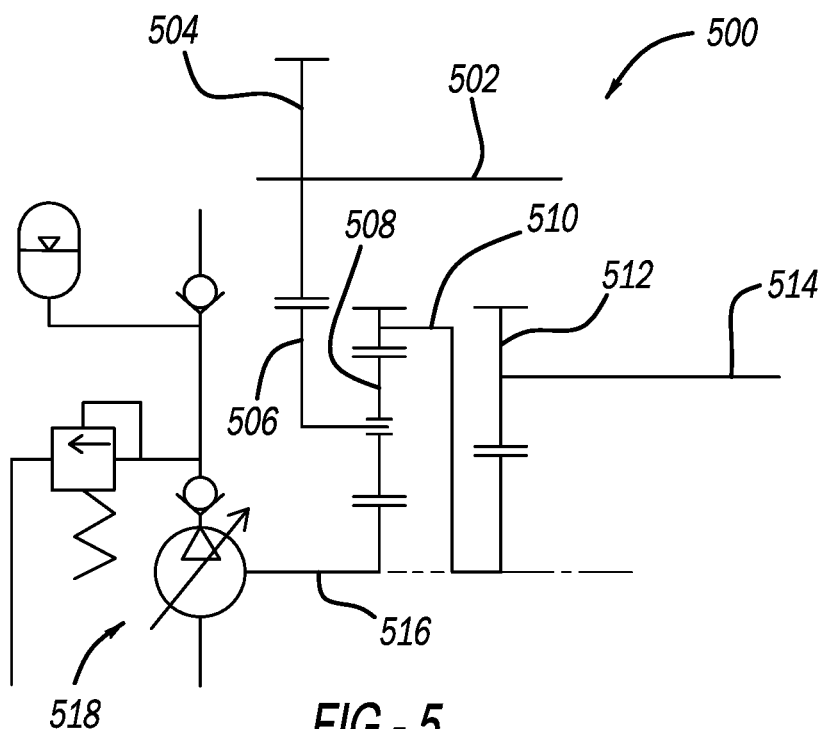
FIG. 5 is a schematic representation of yet another exemplary embodiment of a VCR gear box in accordance with the present disclosure.

FIG. 5 is a schematic diagram of an exemplary VCR gear box 500 which includes a variable displacement pump 518 in accordance with the present disclosure. The variable displacement pump 518 may be controlled in a manner which varies the phase of a control shaft 514 relative to the crank shaft 502 in order to vary the compression ratio of an engine assembly which includes the VCR gear box 500. The VCR gear box 500 includes a crank shaft 502, a driven gear 504, a carrier 506, a planetary gear 508, a ring gear 510, a drive gear 512, a control shaft 514, a sun gear 516, and the variable displacement pump 518. The VCR gear box 500 operates similar to the VCR gear box 300 described with reference to FIG. 3 in that it includes a planetary gear train design. The VCR gear box 500 forms a first torque path from the crank shaft 502 that extends through the driven gear 504, the carrier 506, the ring gear 510, the drive gear 512 and to the control shaft 514. The carrier 506 also engages the sun gear 516 which is fixed to the variable displacement pump 518. The VCR gear box 500 forms a second torque path from the crank shaft 502 that extends through the driven gear 504, the carrier 506, and the sun gear 516 to the variable displacement pump 518. The VCR gear box 500 splits the torque between the first and second torque paths such that the first torque path carries a higher torque than the second torque path. In this manner, any variation in the amount of torque that is driving the variable displacement pump 518 causes a variation in the phase of the control shaft 514 relative to the crankshaft 502 which, in turn, varies the compression ratio of a VCR engine assembly which includes the VCR gear box 500. The variation in the amount of torque that drives the variable displacement pump 518 may be controlled by varying the displacement of the variable displacement pump 518. An increase in the displacement of the variable displacement pump 518 will cause the speed of the variable displacement pump 518 to slow down which will increase the speed of the ring gear 510, thereby advancing the control shaft 514 and increase the compression ratio of a VCR engine assembly incorporating the VCR gear box 500. In contrast, a decrease in the displacement of the variable displacement pump 518 will cause the speed of the variable displacement pump 518 to increase which will decrease the speed of the ring gear 510, thereby retarding the control shaft 514 and decreasing the compression ratio of a VCR engine assembly incorporating the VCR gear box 500. In a preferred embodiment of the present disclosure the variable displacement pump 518 may provide a flow of oil to the VCR engine assembly incorporating the VCR gear box 500.

Figure 6:
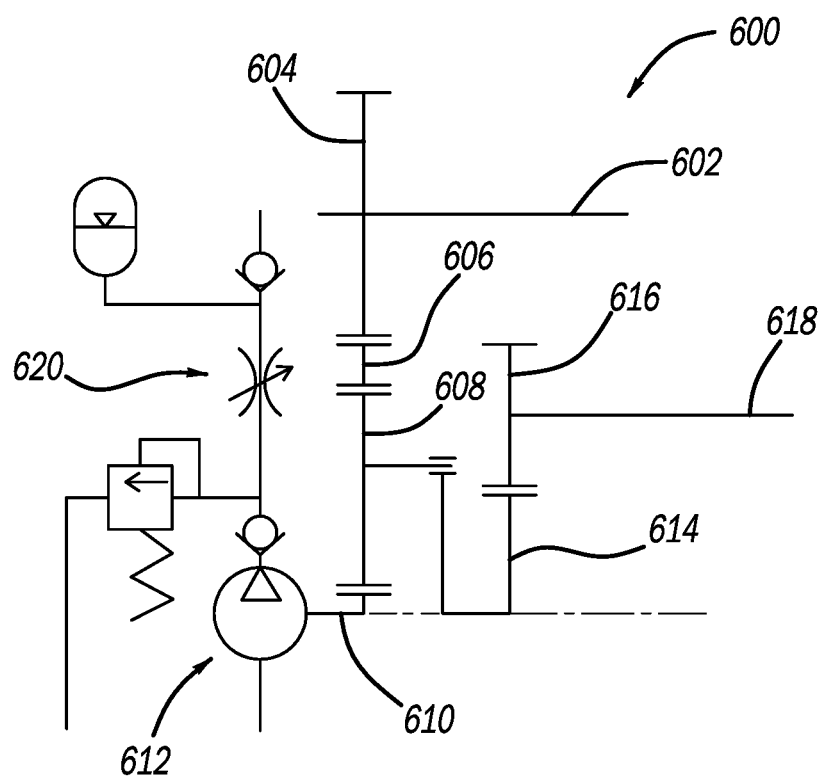
FIG. 6 is a schematic representation of an additional exemplary embodiment of a VCR gear box in accordance with the present disclosure.

FIG. 6 is a schematic diagram of an exemplary VCR gear box 600 which includes a pump 612 in communication with a variable orifice 620 in accordance with the present disclosure. The pump 612 together with the variable orifice 620 may be controlled in a manner which varies the phase of the control shaft 618 relative to the crank shaft 602 in order to vary the compression ratio of an engine assembly which includes the VCR gear box 600. The VCR gear box 600 includes a crank shaft 602, a driven gear 604, a ring gear 606, a cycloidal reducer 608, a sun gear 610, the pump 612, a transfer shaft 614, a drive gear 616, a control shaft 618, and the variable orifice 620. The driven gear 604 is fixed to the crank shaft 602 and engages the ring gear 606. The ring gear 606 engages the cycloidal reducer 608. The cycloidal reducer 608 engages the transfer shaft 614 which, in turn, engages the drive gear 616 that is fixed to the control shaft 618. The VCR gear box 600 forms a first torque path from the crank shaft 602 that extends through the driven gear 604, the ring gear 606, the cycloidal reducer 608, the transfer shaft 614, the drive gear 616, and the control shaft 618. The cycloidal reducer 608 also engages the sun gear 610 which is fixed to an output of the pump 612. The VCR gear box 600, therefore, also forms a second torque path that extends from the crank shaft 602, through the driven gear 604, the ring gear 606, the cycloidal reducer 608, the sun gear 610 to the pump 612. The VCR gear box 600 splits the torque between the first and second torque paths such that the first torque path carries a higher torque than the second torque path. In this manner, any variation in the amount of torque that is driving the pump 612 causes a variation in the phase of the control shaft 618 relative to the crankshaft 602 which, in turn, varies the compression ratio of a VCR engine assembly which includes the VCR gear box 600. In particular, reducing the size of the variable orifice 620 will increase the resistance to flow from the pump which will slow the speed of the pump 612. This will increase the speed of the transfer shaft 614, thereby advancing the control shaft 618 and increase the compression ratio of a VCR engine assembly incorporating the VCR gear box 600. In contrast, increasing the size of the variable orifice 620 will reduce the resistance to flow from the pump 612. This will cause the speed of the pump 612 to increase which will decrease the speed of the transfer shaft 614, thereby retarding the control shaft 618 and decreasing the compression ratio of a VCR engine assembly incorporating the VCR gear box 600. In a preferred embodiment of the present disclosure the pump 612 may provide a flow of oil to the VCR engine assembly incorporating the VCR gear box 600.

As explained above, the actuator of the VCR gear box in accordance with the present disclosure may be any power consuming component. It is advantageous to use an actuator that may already exist within an engine assembly. While the present disclosure provides specific examples of a variable displacement oil pump and a variable orifice-controlled oil pump, the present disclosure is not so limited. An actuator may be any power consuming component such as for example, an electric motor (including a 48 Volt motor), an alternator, a generator, a coolant pump, a clutch, a brake, and the like without limitation. Further, while the detailed description of the present disclosure goes into detail describing VCR gear boxes having a planetary, or cycloidal configuration, it is to be understood that the present disclosure is not limited to any particular configuration so long as the VCR gear box splits the torque from the crank shaft between the actuator and the control shaft. Other examples of a VCR gear box which may be used in an exemplary embodiment of the present disclosure include a strain wave gear box, a roller reducer, and the like without limitation.

Preferably, the VCR gear box has a high gear ratio so that the torque provided to the actuator is significantly smaller than that provided to the control shaft. This enables the use of an actuator having a significantly reduced power consumption while continuing to enable control over the compression ratio of the engine by varying the power consumption of the actuator.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An engine assembly comprising:
   a crankshaft;
   a bell crank pivotally mounted on the crankshaft, the bell crank having a first end and a second end opposite of the first end;
   a connecting rod connected to the first end of the bell crank;
   a control shaft;
   a control link mounted on the control shaft and connected to the second end of the bell crank;
   a driven gear fixed to the crankshaft;
   a drive gear fixed to the control shaft;
   an actuator; and
   a split-torque gear box splitting the torque from the driven gear between the drive gear via a first torque path and the actuator via a second torque path.

2. The engine assembly of claim 1, wherein the split-torque gear box comprises a planetary gear set comprising:
   a carrier engaging the driven gear;
   a sun gear engaging the actuator;
   a ring gear engaging the drive gear; and
   a planetary gear rotatably mounted on the carrier and engaging the sun gear and the ring gear.

3. The engine assembly of claim 1, wherein the split-torque gear box comprises a cycloidal gear set comprising:
   a ring gear engaging the driven gear;
   a sun gear engaging the actuator;
   a transfer shaft engaging the drive gear; and a cycloidal reducer rotatably connected to the transfer shaft.

4. The engine assembly of claim 1, wherein the gear ratio of the second torque path is higher than the gear ratio of the first torque path.

5. The engine assembly of claim 1, wherein the actuator comprises a variable displacement oil pump that is driven via the second torque path.

6. The engine assembly of claim 5, wherein increasing the displacement of the variable displacement oil pump slows down the speed of the variable displacement pump to advance the control shaft and increase a compression ratio of the engine assembly.

7. The engine assembly of claim 5, wherein decreasing the displacement of the variable displacement oil pump increases the speed of the variable displacement pump to retard the control shaft and decrease a compression ratio of the engine assembly.

8. The engine assembly of claim 1, wherein the actuator comprises an oil pump in communication with a variable orifice and which is driven via the second torque path.

9. The engine assembly of claim 8, wherein decreasing the size of the variable orifice slows down the speed of the oil pump to advance the control shaft and increase a compression ratio of the engine assembly.

10. The engine assembly of claim 8, wherein increasing the size of the variable orifice increases the speed of the oil pump to retard the control shaft and decrease a compression ratio of the engine assembly.

11. An internal combustion engine, the engine comprising:
 a crankshaft;
 a bell crank pivotally mounted on the crankshaft, the bell crank having a first end and a second end opposite of the first end;
 a connecting rod connected to the first end of the bell crank;
 a control shaft;
 a control link mounted on the control shaft and connected to the second end of the bell crank;
 a driven gear fixed to the crankshaft;
 a drive gear fixed to the control shaft;
 an actuator; and
 a split-torque gear box splitting the torque from the driven gear between the drive gear via a first torque path and the actuator via a second torque path.

12. The internal combustion engine of claim 11, wherein the split-torque gear box comprises a planetary gear set comprising:
 a carrier engaging the driven gear;
 a sun gear engaging the actuator;
 a ring gear engaging the drive gear; and
 a planetary gear rotatably mounted on the carrier and engaging the sun gear and the ring gear.

13. The internal combustion engine of claim 11, wherein the split-torque gear box comprises a cycloidal gear set comprising:
 a ring gear engaging the driven gear;
 a sun gear engaging the actuator;
 a transfer shaft engaging the drive gear; and
 a cycloidal reducer rotatably connected to the transfer shaft.

14. The internal combustion engine of claim 11, wherein the gear ratio of the second torque path is higher than the gear ratio of the first torque path.

15. The internal combustion engine of claim 11, wherein the actuator comprises a variable displacement oil pump that is driven via the second torque path.

16. The internal combustion engine of claim 15, wherein increasing the displacement of the variable displacement oil pump slows down the speed of the variable displacement pump to advance the control shaft and increase a compression ratio of the engine assembly.

17. The internal combustion engine of claim 15, wherein decreasing the displacement of the variable displacement oil pump increases the speed of the variable displacement pump to retard the control shaft and decrease a compression ratio of the engine assembly.

18. The internal combustion engine of claim 11, wherein the actuator comprises an oil pump in communication with a variable orifice and which is driven via the second torque path.

19. The internal combustion engine of claim 18, wherein decreasing the size of the variable orifice slows down the speed of the oil pump to advance the control shaft and increase a compression ratio of the engine assembly.

20. The internal combustion engine of claim 18, wherein increasing the size of the variable orifice increases the speed of the oil pump to retard the control shaft and decrease a compression ratio of the engine assembly.

* * * * *